INVENTORS
BERNARD HEIMANN
NATHAN OBERG
LLOYD P. DUNCAN
BY
Mason, Mason & Albright
ATTORNEYS Dec. 9, 1969

B. HEIMANN ET AL 3,482,593

AUTOMATIC VACUUM REGULATOR

Filed Jan. 3, 1967

INVENTORS
BERNARD HEIMANN
NATHAN OBERG
LLOYD P. DUNCAN

BY

Mason, Mason & Albright

ATTORNEYS

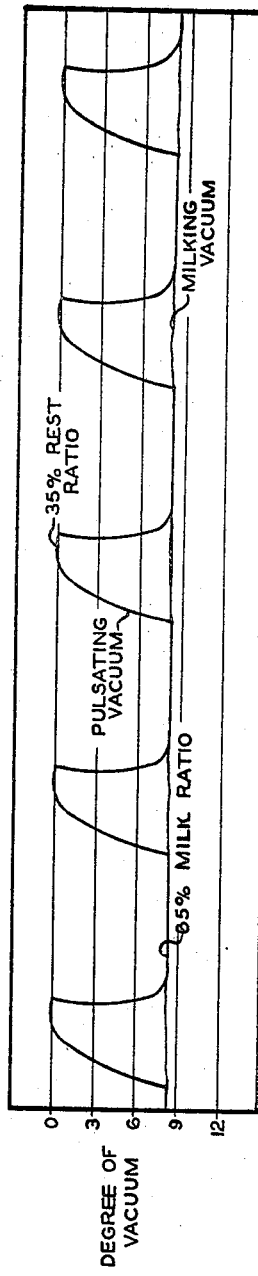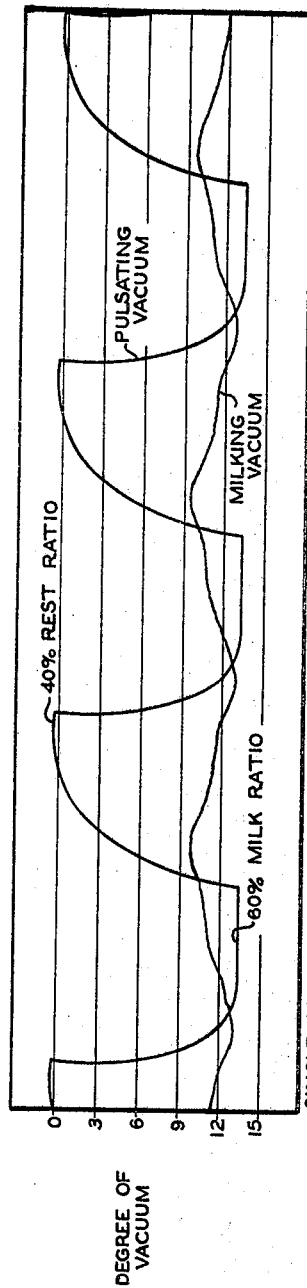

Dec. 9, 1969  B. HEIMANN ET AL  3,482,593
AUTOMATIC VACUUM REGULATOR
Filed Jan. 3, 1967  5 Sheets-Sheet 4

INVENTORS
BERNARD HEIMANN
NATHAN OBERG
LLOYD P. DUNCAN
BY
Mason, Mason & Albright
ATTORNEYS Dec. 9, 1969   B. HEIMANN ET AL   3,482,593
AUTOMATIC VACUUM REGULATOR
Filed Jan. 3, 1967   5 Sheets-Sheet 5

INVENTOR
BERNARD HEIMANN
NATHAN OBERG
LLOYD P. DUNCAN
BY
Mason, Mason & Albright
ATTORNEYS

United States Patent Office 3,482,593
Patented Dec. 9, 1969

3,482,593
AUTOMATIC VACUUM REGULATOR
Bernard Heimann, Lloyd P. Duncan, and Nathan Oberg, Washington, Mo., assignors to Zero Manufacturing Company, Washington, Mo., a company of Missouri
Filed Jan. 3, 1967, Ser. No. 606,770
Int. Cl. A01j 5/00
U.S. Cl. 137—512                                    11 Claims

ABSTRACT OF THE DISCLOSURE

A vacuum pressure regulator for a dual vacuum milking system wherein a high vacuum source draws milk to a storage receptacle and a lower vacuum is applied to the farm animal's teats. Both the high vacuum and lower vacuum lines connect into an enclosed space. A valve at the high vacuum connection is weight biased to open in response to higher relative pressure in the enclosure. A further valve from the atmosphere into the enclosed space is weight biased to admit air into the enclosed space when the vacuum therein rises above a predetermined level. An adjustable extension from the atmospheric valve, upon opening sufficiently, bears against the weight of the vacuum valve so that the weight bias of the atmospheric valve is increased while the weight bias of the vacuum valve is simultaneously decreased and there is a dampening effect on any tendency of the valves to hunt in reaction to each other. Alternatively, over-reaction of the valves may be damped by separate adjustable extensions to prevent undue closing of the vacuum valve or opening of the atmospheric valve.

Cross references to related applications

The purpose of this invention is to regulate the vacuums of the dual vacuum systems disclosed in applications Ser. No. 398,192, filed Sept. 22, 1964, now U.S. Patent No. 3,373,720 and Ser. No. 495,290, filed Oct. 12, 1965, now U.S. Patent No. 3,406,663.

Background of the invention

The invention relates to an automatic vacuum regulator for the milking installation on a dairy farm. More particularly, it relates to means for achieving a substantially nonfluctuating vacuum at the farm animal's teats while simultaneously providing sufficient higher vacuum to draw milk subjected to the lower vacuum obtaining at the cow's teats to a storage receptacle.

It has been suspected for some time that mastitis is caused or aggravated by fluctuations in the vacuum to which a cow's teats are subjected in the milking operation—particularly where there is an air-bleed into the claw as obtains in most existing pipeline bulk milking systems. The patent applications cross-referenced above disclose system compatible with bulk milking wherein a constant vacuum is maintained at the farm animal's teats. An important element in the system, particularly if a single vacuum pump is desired, is the means employed to regulate the level of the vacuums. Vacuum regulators to regulate the amount of vacuum in the vacuum line of a milking system have long been known in the art. An early example of a vacuum regulator is disclosed in U.S. Patent No. 929,764, issued Jan. 28, 1909, to J. H. Hoover. However, known regulators have not been fully satisfactory in the dual-vacuum milking system as disclosed in the above cross-referenced applications.

Summary of the invention

The regulator of the invention maintains two levels of vacuum with a single outlet to the atmosphere which does not open unless both vacuums are at their preset level. If the low vacuum drops below a predetermined level, the present level is quickly recovered by an increase in the flow to the high vacuum side. In the event the demand becomes too great, both the high and low sides will drop while maintaining substantially the same vacuum differential at the milker units.

Thus, an important purpose of the vacuum regulator described herein is the maintenance of a substantially nonfluctuating lower milking vacuum at a predetermined pressure for milking farm animals while at the same time maintaining a sufficiently higher relatively constant vacuum for drawing milk from the milker receptacle. The object of the invention is to accomplish this purpose in a superior manner by drawing fluid at less than atmospheric pressure (air and gaseous fluids removed from the milk) from the low vacuum into the high vacuum side through an appropriately biased restriction so that a substantially constant pressure differential is maintained between the high and low vacuum sides, and by drawing atmospheric air as needed into the low vacuum side to maintain same at a constant vacuum. This object is further accomplished by linking the biased restriction of the high side to the means for maintaining a constant vacuum on the low side so that hunting therebetween is prevented. Still further, hunting can be restricted by providing means to limit closing of the high side and opening on the low side which is particularly advantageous with vacuum pumps up to three horsepower.

The regulator is advantageous in that there is a single outlet to the atmosphere on the low vacuum side and thus all air must pass through the low vacuum side for regulation of the high vacuum side. A further advantage lies in the fact that the high vacuum side valve never completely seats, thus minimizing undue restrictions and fluctuations on the low vacuum side.

Other objects, adaptabilities and capabilities will appear as the description progresses, reference being had to the accompanying drawings, in which:

Brief description of the drawings

FIGURES 4A, 4B, 4C and 4D are vacuum stability charts showing the vacuum stability achieved by a milking system in accordance with the invention and by conventional milking systems.

Description of the preferred embodiment

Figure 1:
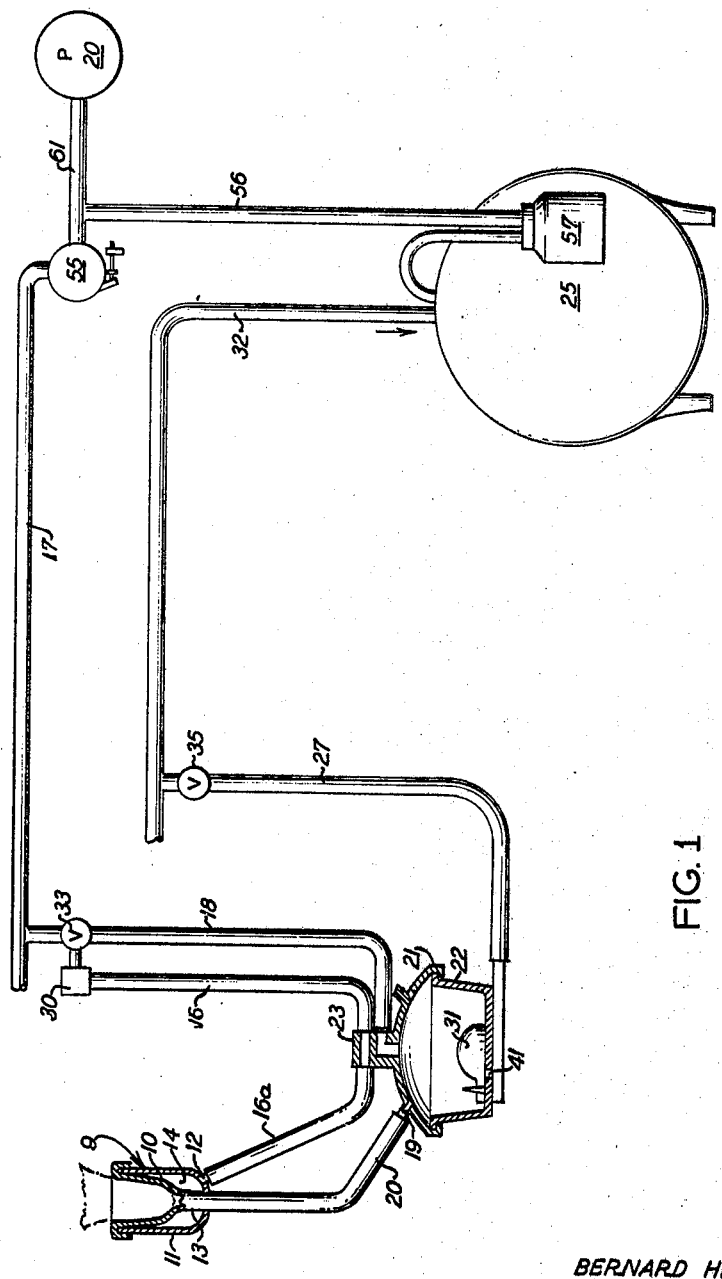
FIGURE 1 is a diagrammatic representation of the combination of the automatic pressure regulator with a preferred milking system in accordance with the invention.

Referring to FIGURE 1, a teat cup 9 (of a conventional set of four teat cups) comprises an inflation 10, a casing 11, and an annular chamber 14 therebetween. Individual pulsator conduits 16a connect through connections 12 from chambers 14 with a manifold-like member 23, which in turn provides an operative connection through valve 33 with milker pulsator conduit 16. The inflations 10 are caused to pulsate by the alternate application of vacuum and atmosphere, and thus massage the farm animal's teats.

The milk hoses 20 from the teat cups 9 conduct milk from milk channels 13 into the manifold or claw 21 via the nipples 19 which receive the milk hoses 20. Removably and hermetically secured to the claw 21 is a milk-receiving pail 22. The pail 22 and claw 21 are separable primarily to facilitate inspection and cleaning and may be integral.

A duct 18 extends from the upper part of claw 21, from the member 23 and through valve 33 to an operating vacuum line 17.

A floatable valve means 31 is disposed in the lower portion of the pail 22 over milk outlet 41. When there is sufficient milk in the pail 22 to lift the valve means 31, milk is drawn to the bulk milk vacuum tank 25 from the outlet 41 and via the milk conduit line 27, valve 35 and the main milk operating line 32. Although there will be considerable variation between installations due to the specific design and relationship of the milking space and milk storage room, usually the milk will have to be drawn vertically upward several feet and a six-foot vertical rise is not uncommon. In order that the milk can be drawn at a practical rate from the individual milker units to a milk receiving means such as tank 25, it is necessary that the vacuum applied in the tank 25 be substantially greater than that applied to the claw 21 through duct 18. In practice, with a vertical rise on the order of 5½ feet, it has been found that, with a vacuum of 10 inches of mercury at the claw 21, a vacuum of 17 inches of mercury at the tank 25 is sufficient. To obtain these vacuums, an automatic vacuum regulator valve 55 is located, as shown in FIGURE 1, between the vacuum line 17 and a further line 61 which connects to the inlet of vacuum pump 26. The tank vacuum line 56 leads from line 61 into the bulk milk vacuum tank 25 via trap 57.

Figure 2:
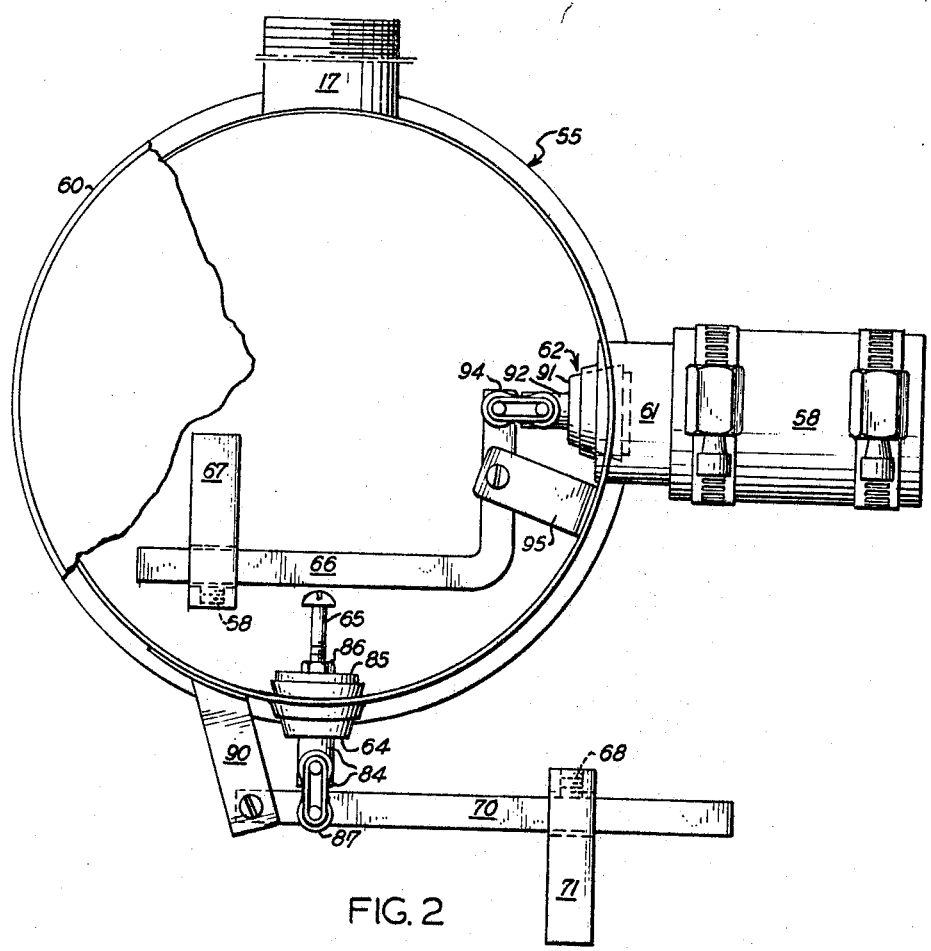
FIGURE 2 is an elevational view of the regulator in partial section.
Figure 3:
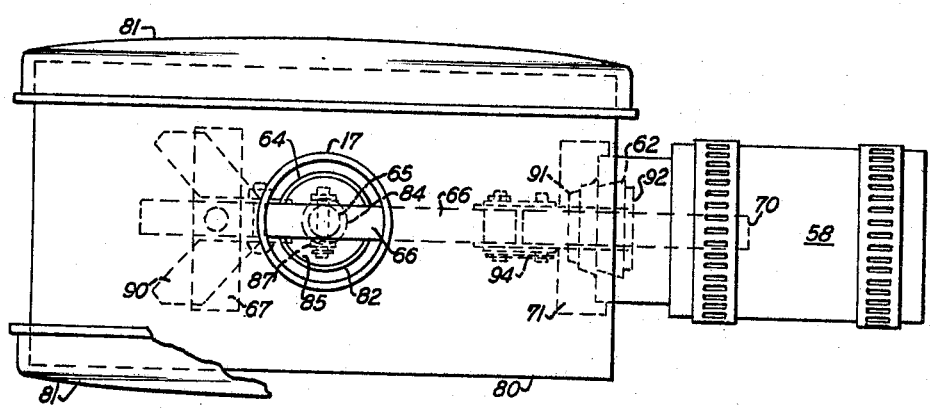
FIGURE 3 is a plan view of the regulator.

The details of the vacuum regulator valve 55 are shown in FIGURES 2 and 3. A hermetically sealed enclosure 60 comprises a cylindrical part 80 and a pair of cap members 81. On its upper side, cylindrical part 80 receives the vacuum line 17. The vacuum source conduit consisting of line 61 including a coupling member 58, is received horizontally through the side of the cylindrical part 80. The lower portion of the cylindrical part 80 includes an opening for the valve means 64. These are the only openings into the enclosure 60.

The valve means 64 includes stopper 82 which may be composed of rubber and is secured to a shaft 84 having a flange 85 firmly secured thereto. The shaft 84 has a threaded bore through its longitudinal axis in which is received linkage means comprising a bolt 65. The bolt 65 is selectively secured in desired positions with the assistance of a nut 86 threadedly received thereon. The shaft 84 is connected to the lever 70 by means of a connecting link 87 so as to support the weight of the lever 70 together with that of the adjustable weight 71. The lever 70 is hingedly secured to struts 90 which extend from cylindrical part 80. The valve means 64 is biased to be closed when inoperative and the weight 71 is set in respect to its location on lever 70 so that the valve means 64 is not unseated until the absolute atmospheric pressure exceeds by some 10 inches of mercury the absolute pressure within enclosure 60 or by such other pressure differential as may be desired.

Restrictive means 62 comprises a stopper member 91 which may be composed of rubber and is secured to a shaft member 92 similar to shaft 84. Shaft member 92 connects to a lever member 66 through a link member 94 similar to the connecting link 87. The lever member 66 is pivotally connected to the strut members 95 extending from the cylindrical part 80 within enclosure 60. The lever member 66 has secured thereto a weight member 67. It will be noted that weight member 67, as is the case with weight 71, can be secured in various selected positions along its lever by set screws 68. Although the restrictive means is biased closed by the weight of lever member 66 together with the weight member 67 in the inoperative position, it is never closed entirely in operative position because of the relatively large volume of fluid (air) drawn through it at minus atmospheric pressure. The position of the weight member 67 is adjusted relative to lever member 66 so as to select the desired pressure differential between enclosure 60 and line 61 to unseat the stopper member 91. It will thus be understood that the valve means 64 serves to maintain a predetermined vacuum pressure in the enclosure 60 whereas the restrictive means 62 maintains a predetermined higher vacuum in line 66 and, with the system as shown in FIGURE 1, in the bulk milk vacuum tank 25.

The linkage means 65 is engageable with the lever member 66 when valve means 64 opens whereby to open valve means 64 further, a greater pressure differential is required between the atmosphere and enclosure. At the same time the weight on lever member 66 is reduced so that less differential pressure between enclosure 60 and line 61 is necessary further to open restrictive means 62. In practice, however, significant changes in the pressure differentials do not develop when such engagement takes place.

Ideally, the capacity of the vacuum pump 26 will be slightly more than enough to pull the desired vacuums, say 10 inches of mercury, in the enclosure 60 and say 17 inches of mercury in line 61, during full milking operations. With such capacity, the restrictive means 62 is normally open while the valve means 64 is closed—opening only from time to time to adjust the vacuum in enclosure 60.

In practice, however, the capacity of the vacuum pump 26 is often significantly greater than the full milking operations actually require so that valve means 64 is normally opened, closing from time to time to regulate vacuum. Also, since movements of value means 64 and restrictive means 62 are not responsive instantaneously to pressure changes (lagging in reaction time for a small but finite period), a following or hunting action may develop. Such action is largely damped, however, by the linkage means 65, which is engageable with the bottom of the lever member 65. As shown, and in practice, any hunting which might tend to develop between the valve means 64 and the restrictive means 62 is quickly damped when the head of linkage means 65 engages the lever member 66. As previously noted, in so doing there is no significant variation in the vacuum pressures for operating purposes—particularly the lower vacuum pressure. Due to its size, the enclosure 60 functions as an accumulator which serves to smooth out small pressure variations that might otherwise appear in vacuum line 17. The use of rubber stopper 82 (which to a minor degree is held in place by its resilience) and the inertia of lever 70 and weight 71, eliminate any tendency that otherwise might exist for the valve to chatter.

Figure 5:
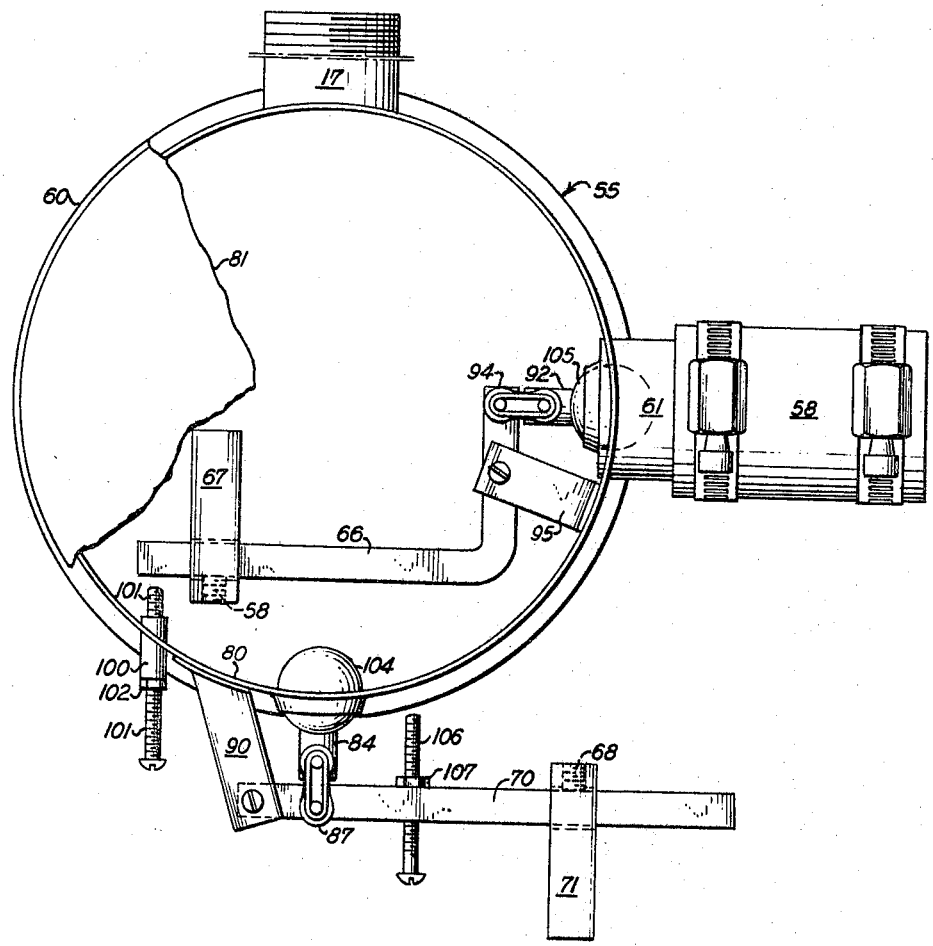
FIGURE 5 is an elevational view in partial section of a modified embodiment of the regulator of the invention.

FIGURE 5 discloses a modified form of the invention which is an improvement over that shown in FIGURES 2 and 3, particularly for ranges in vacuum source from a small vacuum pump up to three horsepower and larger. Similar reference numerals are utilized for similar parts.

A boss 100 welded or otherwise affixed to cylindrical part 80 has a threaded bore to receive bolt 101 which can be firmly secured in place so as to extend into enclosure 60 selected distances, by set nut 102. In a similar manner, a further bolt 106 is received in a threaded bore in lever 70 and is firmly secured in place by a set nut 107.

The stopper 82 and stopper member 91 are replaced by ball valves 104 and 105, respectively, composed of plastic or other suitable material.

For operation, the bolt 101 is adjusted upwardly sufficiently to contact lever member 66 whereby valve 105 is held open and to prevent overswings by the lever member 66. The bolt 106 is adjusted so as to permit the opening of valve 104 as required to regulate the lower vacuum and still prevent overswings; its motion being limited by the cylindrical part 80.

Thus it will be understood that the regulator shown in FIGURE 5 permits the flow of air without restriction and at the same time stabilizes the valves against critical overreactions and prevents hunting.

Figure 4C:
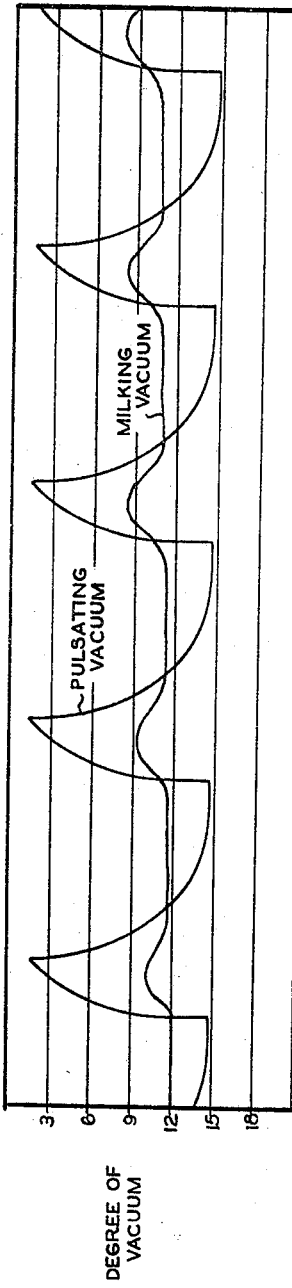
Figure 4D:
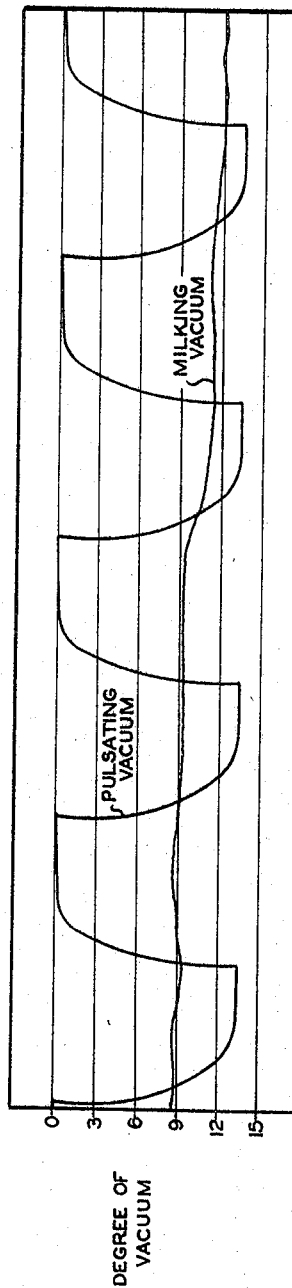

The quality of the nonfluctuating vacuum is shown in the chart, FIGURE 4A, which was taken from a milker unit in combination with a system of the type disclosed in FIGURE 1. The line marked "pulsating vacuum" records the vacuum in the annular channel 14, whereas the "milking vacuum" line is the degree of vacuum at the milk channel 13. It will be noted that the milking vacuum is for practical purposes a straight line and that the pulsating vacuum is never significantly higher than the milking vacuum. Thus there is no ballooning of the inflations 10 which is considered to contribute to udder conditions such as mastitis. The charts of FIGURES 4B, 4C and 4D show the vacuum fluctuations of vacuums in conventional milking systems taken from comparable locations. In each case, the pulsating vacuum is greater during a portion of its cycle than the milking vacuum, thus causing ballooning of the inflations. Moreover, in all such cases (FIGURES 4B, 4C and 4D) significant fluctuations occur in the milking vacuum.

Milking by the method disclosed herein is as fast and usually faster than conventional methods and when used over a period of time, is accompanied by marked decrease in mastitis conditions in herds previously milked by modern commercial equipment and a significant increase in milk production.

While we have described the preferred embodimnt of our invention, it is to be understood that it is capable of other adaptations and modifications.

Having thus described our invention, what we claim as new and desire to secure by Letters Patent of the United States is:

1. An automatic vacuum regulator for maintaining a nonfluctuating vacuum for milking farm animals which comprises a housing providing an enclosed space (60), a milking conduit (17) communicating with said space, a vacuum source (61) communicating with said space, first adjustable biased valve means (62) between said space and said vacuum source, second adjustable biased valve means (64) between said space and a higher pressure fluid source, and limit control means (70, 71) connected with said second valve means for selectively admitting fluid into said space from said higher pressure fluid source to maintain a substantially constant pressure differential between said higher pressure fluid source and said space.

2. An automatic vacuum regulator for maintaining a nonfluctuating vacuum for milking farm animals which comprises an hermetically sealed enclosure (60), a milking conduit (17) extending into said enclosure, a vacuum source conduit (61) extending into said enclosure, first adjustable valve means (62) between said vacuum source conduit and the interior of said enclosure, said first valve means biased whereby fluid flow through said vacuum source conduit increases as a result of an increase in the pressure difference between said enclosure and said vacuum source and is decreased in response to a decrease in said pressure difference, and second adjustable valve means (64) associated with the interior of said enclosure and an atmospheric pressure source, said second valve means biased whereby air is selectively admitted into said enclosure in response to an increase in the pressure difference between atmospheric pressure and the pressure in said enclosure.

3. An automatic vacuum regulator for maintaining a nonfluctuating vacuum for milking farm animals which comprises an hermetically sealed enclosure (60), a milking conduit (17) extending into said enclosure, a vacuum conduit (61) extending into said enclosure, restrictive means (62) associated with said vacuum source conduit and the interior of said enclosure, said restrictive means biased whereby fluid flow through said vacuum source conduit increases as a result of an increase in the pressure difference between said enclosure and said vacuum source and is decreased in response to a decrease in said pressure difference, and valve means (64) associated with the interior of said enclosure and an atmospheric pressure source, said valve means biased whereby air is admitted into said enclosure in response to an increase in the pressure difference between atmospheric pressure and the pressure in said enclosure, damping means (65) between said restrictive means and said valve means, said damping means selectively engaging said valve means and said restrictive means whereby hunting therebetween is damped.

4. An automatic vacuum regulator for maintaining a nonfluctuating vacuum for milking farm animals which comprises an hermetically sealed enclosure (60), a milking conduit (17) extending into said enclosure, a vacuum source conduit (61) extending into said enclosure, restrictive means (62) associated with said vacuum source conduit and the interior of said enclosure, said restrictive means biased whereby fluid flow through said vacuum source conduit increases as a result of an increase in the pressure difference between said enclosure and said vacuum source and is decreased in response to a decrease in said pressure difference, and valve means (64) associated with the interior of said enclosure and an atmospheric pressure source, said second valve means biased whereby air is admitted into said enclosure in response to an increase in the pressure difference between atmospheric pressure and the pressure in said enclosure, a pair of adjustable limiting means (101, 106), one of said limiting means (101) acting to limit said restrictive means from closing beyond a selected amount, the other of said limiting means (106) acting to limit said valve means from opening beyond a selected amount.

5. An automatic vacuum regulator in acordance with claim 3 wherein said restrictive means comprises a biasing means which includes a pivoted lever (66) and a weight (67) for biasing said restrictive means, said damping means being operatively engageable with said biasing means and said valve means.

6. An automatic vacuum regulator in accordance with claim 5 wherein said damping means comprises rod means of adjustable length extending upwardly from said valve means.

7. An automatic vacuum regulator in accordance with claim 3 wherein said valve member comprises means for its biasing, said latter means including a pivoted lever member (70) and a weight member (71), said damping means being operatively engageable with said means for biasing said valve member and said restrictive means.

8. An automatic vacuum regulator in accordance with claim 7 wherein said dampening means comprises rod means of adjustable length extending upwardly from said valve means.

9. An automatic vacuum regulator in accordance with claim 6 wherein said restrictive means comprises a biasing means which includes a pivoted lever and a weight for biasing said restrictive means.

10. An automatic vacuum regulator in accordance with claim 9 wherein said damping means comprises rod means of adjustable length extending upwardly from said valve means.

11. An automatic vacuum regulator in accordance with claim 4 wherein said valve member comprises means for its biasing, said latter means including a pivoted member (70) and a weight member (71), and said restrictive means comprises a biasing means which includes a pivoted lever and a weight for biasing said restrictive means, said first mentioned limiting means comprising bolt means adjustable from outside said enclosure.

References Cited

UNITED STATES PATENTS

| | | | |
|---|---|---|---|
| 1,329,451 | 2/1920 | Babson et al. | 119—14.44 X |
| 2,039,421 | 5/1936 | Jansson | 119—14.41 X |
| 2,667,856 | 2/1954 | Heckendorf | 119—14.44 |
| 3,302,613 | 2/1967 | Noorlander | 119—14.14 |
| 3,377,992 | 4/1968 | Baum | 119—14.08 |

HUGH R. CHAMBLEE, Primary Examiner

U.S. Cl. X.R.

119—14.44